(12) United States Patent
Tarmoom et al.

(10) Patent No.: US 8,373,541 B2
(45) Date of Patent: Feb. 12, 2013

(54) VEHICLE REMOTE CONTROL SYSTEM

(75) Inventors: Ehab Tarmoom, Allen Park, MI (US);
 Jeff Wisser, Allen Park, MI (US)

(73) Assignee: Lear Corporation, Southfield, MI (US)

( * ) Notice: Subject to any disclaimer, the term of this patent is extended or adjusted under 35 U.S.C. 154(b) by 840 days.

(21) Appl. No.: 12/211,398

(22) Filed: Sep. 16, 2008

(65) Prior Publication Data

US 2010/0066492 A1 Mar. 18, 2010

(51) Int. Cl.
*G05B 19/00* (2006.01)

(52) U.S. Cl. ............... 340/5.64; 340/426.2; 340/426.15; 340/5.61

(58) Field of Classification Search .................. 455/41.2, 455/77, 125, 566; 340/5.22, 5.72, 426, 6.64, 340/426.2, 426.15, 5.61; 128/204.21; 379/106.03; 370/330; 358/474
See application file for complete search history.

(56) References Cited

U.S. PATENT DOCUMENTS

| | | | |
|---|---|---|---|
| 6,333,975 B1 * | 12/2001 | Brunn et al. | 379/106.03 |
| 6,895,220 B2 * | 5/2005 | Usui | 455/41.2 |
| 7,015,791 B2 * | 3/2006 | Huntzicker | 340/5.54 |
| 7,117,020 B2 * | 10/2006 | Aarnio et al. | 455/566 |
| 7,221,256 B2 | 5/2007 | Skekloff et al. | |
| 7,426,275 B2 * | 9/2008 | Sugawara | 380/264 |
| 7,593,141 B2 * | 9/2009 | Chiu | 358/474 |
| 7,669,598 B2 * | 3/2010 | Rick et al. | 128/204.21 |
| 7,711,462 B2 * | 5/2010 | Daniels et al. | 701/35 |
| 7,778,186 B2 * | 8/2010 | Oman et al. | 340/5.61 |
| 7,949,309 B2 * | 5/2011 | Rofougaran et al. | 455/77 |
| 2002/0109587 A1 * | 8/2002 | Attring et al. | 340/426 |
| 2002/0140545 A1 | 10/2002 | Nietupski et al. | |
| 2004/0145491 A1 | 7/2004 | Nascimento | |
| 2005/0285724 A1 | 12/2005 | Schmidt et al. | |
| 2007/0279186 A1 | 12/2007 | Skekloff et al. | |

OTHER PUBLICATIONS http://www.toyota-global.com/innovation/intelligent_transport_systems/itbs_ap/comfort/in . . . , Comfort—Toyota Motor Corporation Global Website, "ITS-Based Approach", 2 pages, date unknown.
Delphi, "Delphi Smart Phone Connectivity via Bluetooth® Gateway Key Fob", 1 page, date unknown.

* cited by examiner

*Primary Examiner* — Jennifer Mehmood
*Assistant Examiner* — Kaleria Knox
(74) *Attorney, Agent, or Firm* — Brooks Kushman P.C.

(57) ABSTRACT

A remote control system for use with vehicles and other devices having remotely controllable features. The system may include a fob or other similar type of device to support wireless signal communications used to facilitate the remote control. The system may further include a portable device to support display dependent controls or other controls unsuited to the fob. The fob may support wireless communications between the portable device and the controlled device.

20 Claims, 2 Drawing Sheets

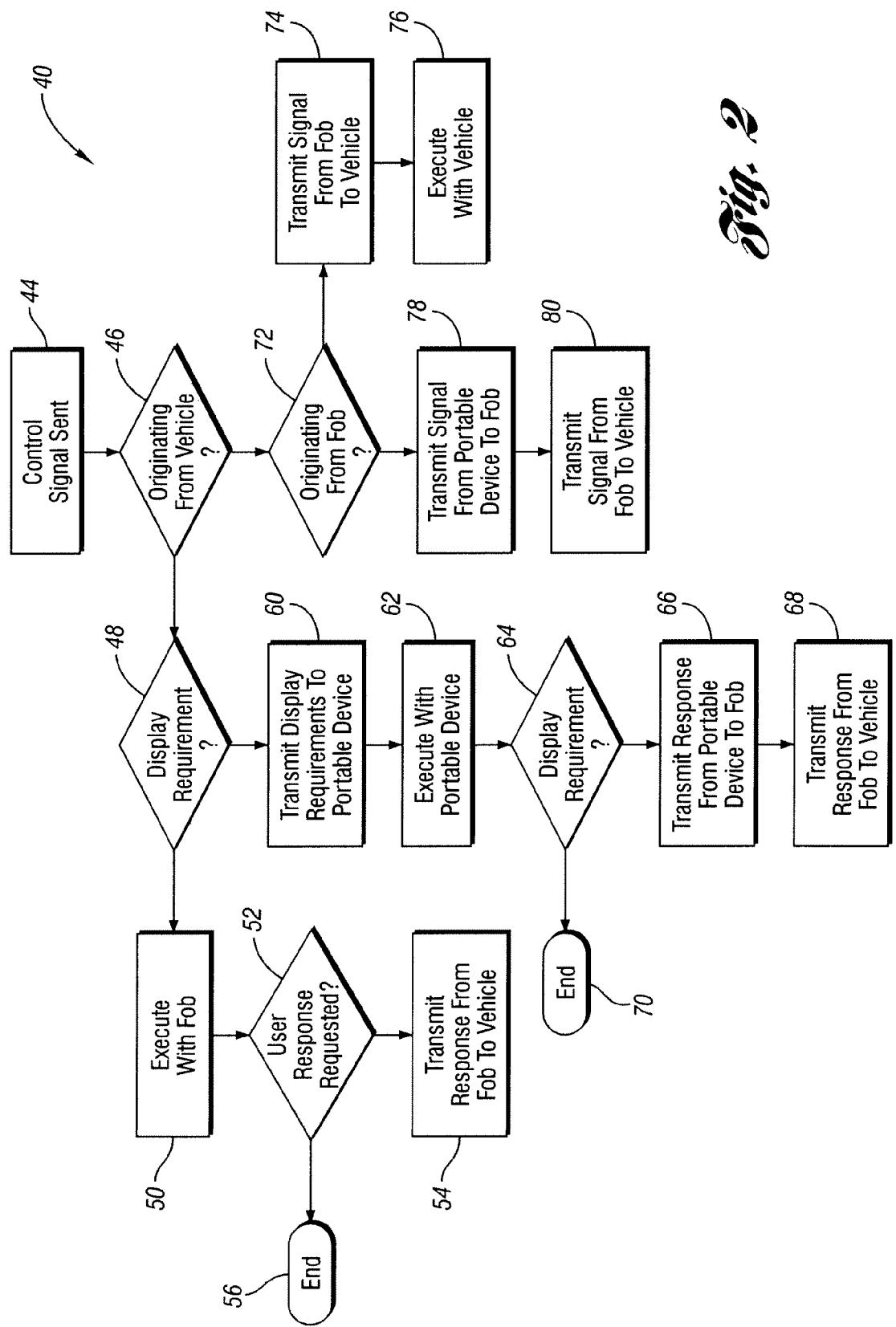

VEHICLE REMOTE CONTROL SYSTEM

BACKGROUND OF THE INVENTION

1. Field of the Invention

The present invention relates to vehicle remote control systems of the type that facilitate remotely controlling one or more vehicle systems with wirelessly transmitted signals.

2. Background Art

An ability to remotely control a vehicle with wirelessly transmitted signals can be helpful in locating, accessing, starting and/or performing any number of other vehicle related operations. Message displays may be used to enhance or make the remote control operations easier to manipulate. The displayed messages can be used to specify variable control options, to convey information to the user, and to perform other operations. The displays, however, tend to add size and costs to remote control system that rely on them.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 2 illustrates a flowchart of a method for wirelessly controlling vehicle operations in accordance with one non-limiting aspect of the present invention.

DETAILED DESCRIPTION OF THE PREFERRED EMBODIMENT(S)

Figure 1:
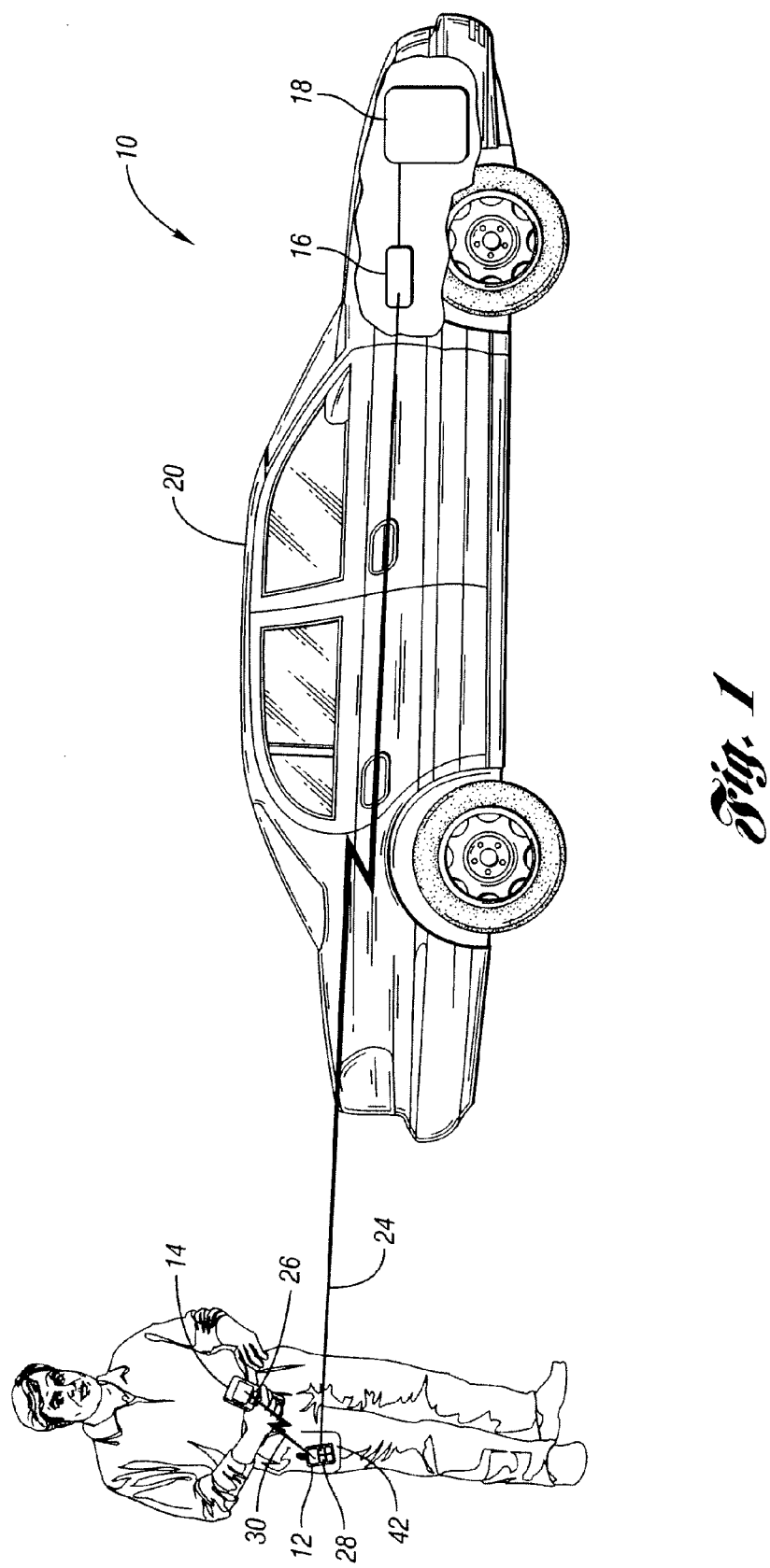
FIG. 1 illustrates a remote control system in accordance with one non-limiting aspect of the present invention.

FIG. 1 illustrates a remote control system 10 in accordance with one non-limiting aspect of the present invention. The vehicle remote control system 10 may facilitate wirelessly commanding vehicle operations with a fob 12, portable device 14, and vehicle mounted module 16, such as to control a vehicle system 18 included in a vehicle 20. The vehicle mounted module 16 may be configured to control or direct the control of the vehicle system 18 according to signals received over a wireless link 24 with the fob 12, such as but not limited to those associated with remote keyless entry (RKE), passive entry (PE), passive start, vehicle tracking/locating, etc.

The actuation of the various controls may be facilitated with buttons 28 included on the fob 12. For example, the fob 12 may include a lock, unlock, trunk, and panic button (not individually labeled). The buttons 28 may be pressed to lock/unlock the vehicle 20, arm/disarm an alarm, open a trunk, and to generate a panic warning. The fob 12 may also be a buttonless device, such as a token, that automatically communicates control signals without requiring button actuation. The button-less fob 12 may be used to facilitate passive vehicle entering and/or starting without requiring user initiation. The fob 12 may also support some combination of button and button-less related controls, i.e. it may execute some controls in response to button actuation and other controls without button actuation.

The fob 12 may be configured to support the desired controls through the exchange of signals with the vehicle mounted module 16. One non-limiting aspect of the present invention contemplates solely relying on the fob 12 to communicate with the vehicle mounted controller 16 due to an inability of the portable device 14 to support similar communications. The communication restraints may result from the portable device 14 having a limited communication range or an inability of the vehicle mounted module 16 to support the wireless communication requirements (protocol) used by the portable device 14. For example, the portable device 14 may be a cell phone, computer, or other device having a display 26 that relies on protocols unsuited to remote vehicle control and/or that are incompatible with typically mounted vehicle RKE/PE modules.

A wireless link 30 may be established between the portable device 14 and the fob 12 to support indirect communications with the vehicle 20. While a wireless link 30 is shown, the link may be through a wire or other direction connection, such as daughter-board, USB, or modular connection. The communication link 30 may be used to support vehicle remote control related signal exchange between the portable device 14 and vehicle 20, such as to support one or more of the above described operations. The portable device 14 may be configured to support remotely controlling the vehicle system 18 by commanding the fob 12 to execute the communications necessary to support the desired remote control The fob 12 may be configured to relay and/or re-package commands received from the portable device 14 for transmission to the vehicle 20. Similarly, instructions, messages, and other information transmitted from the vehicle 20 may be re-packaged and/or relayed from the fob 12 to the portable device 14. The communication link 30 between the fob 12 and portable device 14 and the communication link 24 between the fob 12 and vehicle 20 can be used to support message display dependent remote control operations without having to support information display on the fob 12. This reliance on the portable device 14 to support the display depending interfaces allows the fob 12 to be provided without the additional cost, size, power consumption, and weight otherwise needed to support the display dependent controls.

FIG. 2 illustrates a flowchart 40 of a method for wirelessly controlling vehicle operations in accordance with one non-limiting aspect of the present invention. The method is described with respect to supporting display related controls through use of the portable device 14 and non-display related controls through use of the fob 12. This is done for exemplary purposes and without intending to limit the scope of the present invention. Non-display related controls need not necessary be executed solely with the fob 12, as described below. Rather, the portable device 14 could be used as the point for some or all non-display dependent controls, which may be helpful in reducing the number of devices the user needs to operation. Instead of removing the fob from a pocket 42, the user may simply execute the method described below, including the display and non-display dependent control, through the portable device 14.

The method begins with determining a control signal at block 44. The control signal relates to a signal intended to initiate or direct related control of a feature associated with at least one of the portable device 14, fob 12, or vehicle 20. The control signal can relate to a message display request, RKE command, PE, passive start, vehicle tracking/locating, or other signal associated with facilitating remote control or remote access to the vehicle 20. Block 46 assess whether the requested control originated from the vehicle or one of the remote elements, i.e., the portable device 14 or fob 12.

In some cases, the vehicle 20 may originate a control request to the fob 12 or portable device 14, such as to request user input or to display a message. For example, the vehicle 20 may originate alarms for playback on the fob 12 and/or portable device 14 to warn the user of vehicle theft or damage. The control signal may also originate from the vehicle 20 in response to a prior request from one of the remote elements, such as if one of a remote element requests information from GPS unit or other feature included on the vehicle. In other cases, the control may originate from the fob 12 or portable device 14, such as to request vehicle unlock or trunk opening.

Block 48 assess whether a control signal originating form the vehicle 20 is display depending or otherwise requires conveying information to the user in a manner that is unsupported by the fob 12, which for the purposes of the present invention is commonly referred to a display dependent control but it may similarly be referred to as any control that requires interaction with the portable device 14. If the there is no display requirement and/or the desire control can be execute with the fob 12, block 50 is reached and the related control is executed, such as vibrating the fob 12 to warn the user of vehicle damage. Block 52 assess whether the related control requires a user response, if so, block 54 is reached and the user input response to the fob 12 is then transmitted to the vehicle 20, otherwise the process ends at block 56.

If the control signal is display dependent or otherwise requires interaction with the portable device 14, the fob 12 relays the control signal to the portable device 14 at block 60. If necessary, fob 12 performs required processing or re-packaging. The execution occurs in block 62 where the portable device 14 may display a message to the user or perform any number of other operations. Block 64 assess whether the related control requires a user response, if so, block 66 as reached and the user inputs a response to the portable device 14 that is then transmitted to fob 12 at block 66 and then onto the vehicle at block 68, otherwise the process ends at block 70.

The process described thus far with respect to FIG. 2 ends after a user response to the vehicle originated control signal is transmitted from the fob and/or if no user input is needed. This arrangement allows the present invention to support display dependent remote vehicle control without requiring the displaying device to support direct communications with the vehicle 20. A similar process can be supported when the control signals originate form either of the fob 12 or portable device 14. This process begins in block 72 with an assessment of whether the control signal originated form the fob 12 or portable device 14.

Block 74 relates to a fob originating control signal and the subsequent direct transmission of the control signal from the fob 12 to vehicle 20 for execution at block 76. Conversely, portable device originating control signals are transmitted in block 78 from the portable device 14 to the fob 12 and then in block 80 from the fob 12 to the vehicle 20. The ability to coordinated direct or indirect communications with the vehicle 20 depending on whether the related control signals are fob 12 or portable device 14 originating allows the present invention to support user initiated, display dependent vehicle remote control without require the fob 12 to display information to the user.

The present invention contemplates configuring the portable device 14 to display any type of user interface and other navigatable menus to a user for manipulation and/or message conveyance. The present invention is not intended to be limited to any particular type of display or method of display information, unless otherwise noted. One non-limiting aspect of the present invention is intended to be constrained to supporting communications between the fob 12, portable device 14, and vehicle 20 in a manner the minimizes the display and/or processing demands on the fob 12 through reliance on improved display and/or processing capabilities of the portable device 14.

One non-limiting aspect of the present invention particularly contemplates leveraging off the increasing sophistication of wireless phones to support intricate user interfaces, such as with specially designed vehicle remote control application operating on the phone, that can be used to provide new services and/or enhance the use of know services through a more friendly interface. Optionally, the portable phone may rely on common local area wireless protocols (Bluetooth, Wi-Fi, etc.) to exchange signals between the fob 12 and portable device 14. The fob 12 could then support the less know or more industry specific requirements needed to support communications with the vehicle 20.

The system 10 is predominately described above with respect to wirelessly commanding operations of the vehicle 20. The vehicle 20 is shown for exemplary purposes and is not intended to limit the scope and contemplation of the present invention. The present invention fully contemplates its use and application with other devices and in other environments where it may be beneficial to support remotely controlled operations in a manner commiserate with the scope and contemplation of the present invention.

As supported above, one non-limiting aspect of the present invention relates to establishing a communication link between a fob and a mobile device, such as a cell phone, in order to utilize the mobile device's user interface. A user can then user the mobile device to request remote or other RKE functions and receiver the feedback on the mobile device's display. This optionally includes change a remote control trigger event from a fob to a mobile device. The fob can act as a conduit between the mobile device and a vehicle.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle remote control system for use with a vehicle mounted module configured to control one or more vehicle systems according to instructions carried within remotely transmitted wireless signals, the system comprising:

a fob configured to wirelessly transmit the instructions to the vehicle mounted module, the fob operable in response to commands wirelessly received from a portable device, the portable device being configured to wirelessly command the fob to transmit the instructions used to instruct the vehicle mounted module to control the one or more vehicle systems;

wherein the fob is configured to receive wireless messaging instructions from the vehicle mounted module, the wireless messaging instructions specifying a message to be communicated to a user, wherein the fob outputs the message to the user in the event the fob supports an output requirement of the message and wherein the fob wirelessly commands the portable device to output the message in the event the fob is unable to support the output requirement, the output requirement relating to a visual indicia, the message being output by no more than one of the fob and portable device; and wherein the fob is configured to perform an output requirement arbitration test to determine whether the fob supports the output requirement of the message, whereby the output requirement arbitration test results in the fob outputting the message to the user if information need not be displayed and with the fob commanding the portable device to output the message to the user if information is to be displayed.

2. The system of claim 1 wherein the portable device is a cellular phone having a display and commands the fob according to information shown within the display proximate in time to the portable device receiving one or more inputs.

3. The system of claim 1 wherein the fob supports remote keyless entry (RKE) operations by transmitting RKE related instructions to the vehicle mounted module in response to actuation of one or more buttons included on the fob.

4. The system of claim 1 wherein the fob supports RKE operation by transmitting RKE related instructions to the vehicle mounted module in response to receiving corresponding RKE related commands from the portable device.

5. The system of claim 1 wherein the fob is a button-less passive entry (PE) device configured to automatically transmit PE related instructions to the vehicle.

6. The system of claim 1 wherein the fob has a greater wireless transmission range than the portable device.

7. The system of claim 6 wherein the portable device is a portable phone and the fob is connected to the phone as a daughter-board.

8. The system of claim 1 wherein the vehicle mounted module is unable to wirelessly transmit the messaging instructions directly to the portable device and wherein the portable device is unable to wirelessly communicate with the vehicle mounted module.

9. A method of remotely controlling a vehicle system comprising:
displaying a user interface on a first device, the user interface displaying selectable features for use in controlling the vehicle system;
determining selection through the first device of one of the selectable features;
wirelessly transmitting first signals from the first device directly to a second device to indicate the selection of one of the selectable features to a second device;
the wirelessly transmitted first signals causing the second device to wirelessly transmit second signals to a third device included on a vehicle, the second signals indicating selection of the one of the selectable features displayed in the user interface of the first device, the third device processing the second signals for use in controlling the vehicle system; and
the wirelessly transmitted second signals causing the third device to wirelessly transmit third signals to the second device, the second device performing an output requirement arbitration test by processing the third signals to determine if a displayed message is required, the second device executing an operation specified by the third signals with the second device if the displayed message is not required, the second device transmitting fourth wireless signals to the first device if the displayed message is required, the fourth wireless signals causing the first device to display the displayed message.

10. The method of claim 9 further comprising the second signals being transmitted from the second device without the second device displaying user selectable features sufficient to convey the displayed message and while the second device is within a signaling range of the third device.

11. A method of displaying feedback for a remote control event associated with a system included within a vehicle, the method comprising:
wirelessly receiving first feedback signals transmitted from the vehicle at a first device, the first feedback signals specifying a feedback message;
the first device performing an output requirement arbitration test on the first feedback signal to determine whether the feedback message has a display requirement;
the first device outputting the feedback message in the event the feedback message has no display requirement, the first device being unable to display the feedback message in the event the feedback message has the display requirement; and
wirelessly transmitting second feedback signals from the first device to a second device in the event the feedback message has the display requirement, the second device having a display sufficient to display the feedback message, the second feedback signals causing the second device to display the feedback message.

12. The method of claim 11 further comprising transmitting the first feedback signal according to a first protocol and transmitting the second feedback signals according to a second protocol.

13. The method of claim 11 further comprising transmitting the first feedback signals in response to receiving a command signal from the first device, the command signal instigating the remote control event.

14. The method of claim 13 further comprising transmitting the command signal from the first device in response to receiving a related command signal from the second device.

15. The method of claim 11 further comprising transmitting the first wireless signal up to a first distance and transmitting the second wireless signals up to a second distance, the first distance being greater than the second distance, the first distance being within a wireless range of the second device to the vehicle such that the vehicle is able to wirelessly communicate with the second device while the first device receives the first feedback signals.

16. The system of claim 1 wherein the fob identifies the output requirement from the wireless messaging instructions and determines whether the output requirements can be met depending on whether the output requirements specify a display requirement, wherein the fob outputs the message in the event there is no display requirement and wherein the fob wirelessly commands the portable device to output the message in the event there is a display requirement.

17. The system of claim 16 wherein the fob outputs the message in the event the output requirement is at least one of a vibration and an illumination of a light source included on the fob.

18. The method of claim 9 further comprising:
the third device transmitting fifth signals to the second device to request a user response;
the second device processing the fifth signals to determine whether the user response can supported through the second device;
the second device requesting the user response to be input thereto in the event second device can support direct receipt of the user response;
the second device transmitting the user response with sixth signals communicated to the third device upon direct receipt of the user response;

the second device transmitting seventh signals to the first device in the event the second device is unable to support direct receipt of the user response;

the first device requesting the user input to be input thereto in response to receipt of the seventh signals; and the first device transmitting the user response with eighth signal communicated to the third device upon direct receipt of the user response.

19. The method of claim 9 further comprising:

the third device wirelessly transmitting fifth signals to the second device to request a user response;

the second device processing the fifth signals to determine whether the user response can supported through the second device;

the second device requesting the user response to be input thereto in the event second device can support direct receipt of the user response;

the second device wirelessly transmitting sixth signals to the third device upon receipt of the user response thereto, the sixth signals communicating the user response to the third device;

the second device wirelessly transmitting seventh signals to the first device in the event the second device is unable to support receipt of the user response;

the first device requesting the user input to be input thereto in response to receipt of the seventh signals;

the first device wirelessly transmitting eighth signal to the second device upon receipt of the user response thereto, the eighth signals communicating the user response to the second device; and the second device wirelessly transmitting ninth signals to the third device upon receipt of the eighth signals, the ninth signals communicating the user response to the third device.

20. The method of claim 1 further comprising:

the fob receiving a first user response to the message solely through user interaction with the fob if the fob supports the output requirement of the message, the fob wirelessly communicating the first user response to the vehicle mounted module; and the fob receiving a second user response to the message solely through user interaction with the portable device if the fob is unable to support the output requirement of the message, the portable device wirelessly notifying the fob, and not the vehicle mounted controller, of the second user input, the fob wirelessly and subsequently notifying the vehicle mounted module of the second user input.

* * * * *

UNITED STATES PATENT AND TRADEMARK OFFICE
CERTIFICATE OF CORRECTION

PATENT NO. : 8,373,541 B2
APPLICATION NO. : 12/211398
DATED : February 12, 2013
INVENTOR(S) : Tarmoom et al.

It is certified that error appears in the above-identified patent and that said Letters Patent is hereby corrected as shown below:

In the Claims

Column 8, Line 1, Claim 19:

After "wirelessly transmitting eighth"
Delete "signal" and insert -- signals --

Signed and Sealed this
Twenty-fifth Day of June, 2013

Teresa Stanek Rea
*Acting Director of the United States Patent and Trademark Office*